(12) United States Patent
Raday

(10) Patent No.: US 7,842,349 B2
(45) Date of Patent: Nov. 30, 2010

(54) METHOD FOR SPRAY FORMING HIGH MODULUS POLYURETHANE STRUCTURES

(75) Inventor: Robert Michael Raday, Odessa, FL (US)

(73) Assignee: TSE Industries, Inc., Clearwater, FL (US)

( * ) Notice: Subject to any disclaimer, the term of this patent is extended or adjusted under 35 U.S.C. 154(b) by 125 days.

(21) Appl. No.: 11/870,721

(22) Filed: Oct. 11, 2007

(65) Prior Publication Data

US 2009/0098302 A1   Apr. 16, 2009

(51) Int. Cl.
*C08L 75/04* (2006.01)
*B05D 1/06* (2006.01)

(52) U.S. Cl. ............ 427/407.1; 427/427.4; 427/181; 427/202; 427/203; 427/204; 427/206; 427/236; 427/426; 524/871; 524/589; 521/78; 521/117; 521/122; 521/123; 521/124; 428/423.1

(58) Field of Classification Search ............ 524/589, 524/871; 427/407.1, 427.4
See application file for complete search history.

(56) References Cited

U.S. PATENT DOCUMENTS

| | | | |
|---|---|---|---|
| 4,267,299 A | 5/1981 | Oechsle, III | |
| 4,296,230 A | 10/1981 | Pedain et al. | |
| 4,543,366 A | 9/1985 | Smith | |
| 4,616,043 A | 10/1986 | Smith | |
| 4,695,618 A | 9/1987 | Mowrer | |
| 4,809,909 A | 3/1989 | Kukesh | |
| 5,053,274 A | 10/1991 | Jonas | |
| 5,686,187 A | 11/1991 | Turnbach | |
| 5,266,671 A | 11/1993 | Primeaux, II | |
| 5,607,998 A | 3/1997 | Markusch et al. | |
| 5,614,575 A | 3/1997 | Kotschwar | |
| 5,693,696 A | 12/1997 | Garrett et al. | |
| 5,973,099 A * | 10/1999 | Nodelman et al. ......... 528/74.5 | |
| 6,027,764 A | 2/2000 | Gurney | |
| 6,211,259 B1 | 4/2001 | Borden et al. | |
| 6,316,535 B1 | 11/2001 | Caldwell et al. | |
| 6,821,059 B2 | 11/2004 | Markusch et al. | |
| 6,881,764 B2 | 4/2005 | Doesburg et al. | |
| 7,011,865 B2 | 3/2006 | Sengupta et al. | |
| 2003/0092848 A1 | 5/2003 | Sengupta et al. | |
| 2004/0121161 A1 | 6/2004 | Shugert et al. | |
| 2005/0038204 A1 | 2/2005 | Walters | |
| 2005/0277732 A1 | 12/2005 | Yu et al. | |
| 2006/0014846 A1* | 1/2006 | Sparks et al. ............... 521/155 | |
| 2006/0208395 A1 | 9/2006 | Shugert et al. | |
| 2007/0021518 A1 | 1/2007 | Cowelchuk et al. | |
| 2007/0049686 A1 | 3/2007 | Bauchet et al. | |

OTHER PUBLICATIONS

J.H. Perry et al., "Development in Structural Polyurethane Spray Systems", 34th Annual Polyurethane Technical/Marketing Conference, Oct. 21-24, 1992, pp. 83-88.
Bayer SPR, Spray Polyurethane Systems, Bayer Polymers Division, "Structural Applications using Baytec SPR", Copyright 1995, Bayer Corporation.
Baytec RE, "Spray Polyurethane Systems For Structural Applications", Miles Polymers Division, Copyright 1993, Miles, Inc.

* cited by examiner

*Primary Examiner*—Marc S Zimmer
*Assistant Examiner*—Noah Frank
(74) *Attorney, Agent, or Firm*—Brooks Kushman P.C.

(57) ABSTRACT

Sprayable polyurethane compositions contain particulate filler in both polyol and isocyanate components for a total content of minimally 30 weight percent of particulate filler and fibrous reinforcement. The isocyanate component is stable with respect to storage, and composite structures prepared therefrom exhibit high modulus and can be used as replacements for unsaturated polyester systems. Resin transfer molding systems employ the same components and produce molded parts with good physical properties.

28 Claims, No Drawings

METHOD FOR SPRAY FORMING HIGH MODULUS POLYURETHANE STRUCTURES

BACKGROUND OF THE INVENTION

1. Field of the Invention

The invention relates to the manufacture of composite structures by spraying multiple layers of polyurethane onto a mold or substrate, and to compositions suitable for use therein. The invention further relates to resin transfer molding processes employing the compositions of the invention, and to products prepared thereby.

2. Description of the Related Art

Spray applied polymer systems have very widespread use in preparing composite structures, for example bathtubs, spas, shower enclosures, boat hulls, storage tanks, and the like. In these applications, addition curable resins such as unsaturated polyester and vinyl ester resins are commonly used. Epoxy resins are sometimes used in demanding applications, but suffer the disadvantage of relatively high cost. The resins used in the largest volume commercially are unsaturated polyester resins. The latter resins also contain considerable amounts of styrene which serves both as a comonomer and diluent.

The resin systems are typically combined with glass fiber reinforcement, which may be woven or non-woven, or present as chopped strand. Typically the spray applied resin is handworked into the fiberglass. This method is especially useful for preparing boat hulls, for example.

A principle drawback of unsaturated polyester resins is that styrene monomer is listed as a class 1 carcinogen, and its use is becoming increasingly regulated. Spray application exacerbates these problems since a fine mist is invariably produced in the spray process, from which styrene rapidly volatilizes. Workers must generally wear protective breathing devices, and enclosed spaces must be carefully ventilated.

Polyurethanes have occasionally been used in spray applications, mostly in the field of rigid insulating foam. Elastomeric foams have also been used in sandwich structures, for example between fiber reinforced polyester layers. Polyurethane systems are at least two component systems where the isocyanate-reactive components such as polyols, crosslinkers, chain extenders, and the like, in addition to catalysts are stably prepared as a "B-side," and the isocyanate(s) are contained into the "A-side." The A and B sides are supplied to a mixhead and intensively mixed; both static and mechanical mixers as well as impingement mixing have been used. Less commonly in spray applications, individual components, perhaps as many as 6 or 7 components, are supplied to the mixhead rather than A and B sides. The mixhead in such applications becomes very unwieldy, and such systems are generally limited to foam-in-place applications such as for seating foams and slab foams, and in RIM (reaction injection molding). Following mixing of the isocyanate and isocyanate-reactive components, rapid reaction occurs, producing the polyurethane polymer.

Polyurethanes have numerous advantageous properties as compared with unsaturated polyester resins, and as they contain no styrene, their use eliminates that concern from manufacturing operations. Unfortunately, the cost of polyurethane systems is somewhat higher than polyester systems. More importantly, while tensile elongation may be superior to cured polyester, modulus is generally somewhat inferior. Many structures which are desired to be spray manufactured require high stiffness. Heat distortion temperature is also an important parameter in many applications. Flexural modulus of sprayed polyurethane systems have been invariably below 600,000-700,000 psi, which is too low for many demanding applications.

Adding fibrous or particulate fillers is one method of increasing modulus. However, chopped fibers cannot ordinarily be incorporated into the reactive components themselves, but are often supplied to the spray cone, which directs the then-coated fibers to the substrate. Particulate fillers must be of such size so as to remain sprayable, which generally means that only fillers of very small size and correspondingly high surface area must be used. However, when appreciable amounts of high surface area filler are added to the polyol side (B-side), the viscosity increases greatly in proportion to filler content, such that at high filler loadings, the composition cannot be efficiently conveyed to the spray head or be sprayed. Thus, the highest amount of filler tolerable in the polyol side is approximately 50% by weight. Fillers are not generally added to the isocyanate (A-side), and when preparing laminate structures with multiple layers of polyurethane, use of fillers has been avoided due to concerns with interlaminar adhesion.

If filler could also be added to the isocyanate side (A-side) as well, the total amount of filler in the cured system would be able to be increased. In the past, fillers have only been added to the isocyanate side for molding and casting operations by incorporating the fillers immediately prior to use. An example of the latter is talc which, when added to non-sprayable polyurethane systems along with glass flakes, can be used to form a non-sagging putty-like mixture useful for repairing bumpers and fascias of automobiles, as disclosed in U.S. Pat. No. 5,607,998. These mixtures are clearly not sprayable.

However, in liquid polyurethane systems, even talc has been considered too reactive for incorporation into the isocyanate side of the polymer system, as surface hydroxyl groups would be expected to react with the isocyanate, and thus the viscosity of the A-side would increase rapidly during transportation and storage. Numerous fillers have been proposed for incorporation into the B-side, but have been considered non-reactive in the overall system, and thus are stated to be incapable of providing sufficient reinforcement to the matrix, preventing high modulus products from being obtained. Thus, for example, in U.S. Pat. No. 5,693,696, sand, clay, and talc are all disclosed as potential fillers for addition to the polyol side (B-side), but must be treated with an adhesion promoter which reacts with surface hydroxyl groups on the filler and also bears an isocyanate-reactive group. Aminoalkyltrialkoxysilanes are touted for this purpose, the alkoxy groups covalently bonding to the filler surface hydroxyl groups, leaving a very reactive alkylamino group to react with the isocyanate. Use of such reactive adhesion promoters adds additional process steps and expense.

U.S. Pat. No. 6,211,259 B1 discloses the use of fillers such as clay, talc, and alumina trihydrate in the polyol side of a polyurethane system which may be sprayed. However, it is difficult to incorporate high amounts of fillers in such systems. U.S. Pat. No. 6,881,764 indicates that fillers are added to the B-side (resin side) of polyurethane systems, and employs glass cullet as a filler. It must be remembered, that the filler content of the polyol side is "diluted" by the A-side upon mixing, and thus a polyol filler content of, for example, 50 percent by weight becomes only 25 percent by weight in the cured product in conventional 1:1 mix ratios.

As disclosed in the above references, particularly U.S. Pat. No. 5,693,696, active hydrogen-containing fillers have been described as not being well incorporated into polyurethanes unless first rendered hydrophobic, or functionalized with organic groups which are also reactive with isocyanates.

It is further desired that the composite structures be impact resistant. Both polyester and epoxy resin systems tend to produce fiber reinforced products which, while displaying high flexural modulus and tensile strength, are nevertheless quite brittle, as indicated by relatively low impact resistance. During manufacturing, for example, the impact of a fall from a transport dolly or the like is sufficient to generate cracks which render the article unusable. It would be desired to produce articles which do not manifest such proclivity to impact damage and yet which exhibit acceptable tensile strength and modulus.

Surprisingly, adding filler in the form of chopped glass fibers to polyurethane systems does not solve these problems. At high loadings of glass fibers, impact strength is adequate, but flexural modulus and tensile strength are low. Surprisingly, an increase in fiber content causes these properties to worsen rather than improve. U.S. Pat. No. 4,543,366 discloses adding particulate and/or chopped fiber fillers up to a total amount of 30 weight percent based on the weight of the urethane system. However, these amounts of fillers are inadequate to produce articles which simultaneously offer high tensile strength, high flexural modulus, resistance to impact damage, and satisfactory heat distortion temperature. Thus, in the twenty plus years since the U.S. Pat. No. 4,543,366 issued, polyurethane systems were not able to supplant polyester systems.

It would be desirable to provide polyurethane systems which are sprayable and which yet contain more than 30 weight percent of filler. It would further be desirable to employ fillers in their unmodified form, i.e. not having been functionalized with isocyanate-reactive surface groups, to simultaneously provide multilayer laminates of good interlaminar adhesion, high tensile strength and flexural modulus, high resistance to impact damage, and high hardness.

Structural parts have also been made by processes generally termed resin transfer molding, or "RTM". There are numerous variants of such processes, such as vacuum assisted RTM, or "VARTM". All these variants are termed "RTM" herein unless specified otherwise.

Resin transfer molding is a closed mold, low pressure molding process, sometimes referred to as a liquid molding process, applicable to the fabrication of complex high performance composite articles of both large and small size. Several different resin transfer molding processes are well known to the skilled of the art. The process is differentiated from various other molding processes in that a reinforcement material, such as fiberglass or other fiber reinforcement material, is first placed into a molding tool cavity and then combined with resin within the mold cavity to form a fiber reinforced plastic ("FRP") composite product.

Typically, a pre-shaped fiber reinforcement, sometimes referred to as a reinforcement preform, is positioned within a molding tool cavity and the molding tool is then closed. A feed line connects the closed molding tool cavity with a supply of liquid resin and the resin is pumped or "transferred" into the tool cavity where it impregnates and envelops the fiber reinforcement and subsequently cures. The cured or semi-cured FRP product then is removed from the molding tool cavity. As used herein, the terms resin transfer molding and RTM are used to refer generically to molding processes wherein fiber reinforcement is positioned in a molding tool cavity into which resin is subsequently introduced. Thus, variations such as so-called press molding or squeeze molding, structural reaction injection molding ("SRIM") and the like are within the scope of such terms. Structural reaction injection molding uses a highly reactive resin system comprising two components pumped from separate holding tanks under pressure into an impingement mixing chamber and from there into the molding tool cavity. The tooling typically comprises a metallic shell to facilitate heat transfer. Although the mixing pressure is relatively high, the overall pressure of the resin in the molding tool typically is only about 50-100 psi. The resin flows into the molding tool cavity and wets-out the fiber reinforcement as the curing reaction is occurring. Typically, the fiber reinforcement material can be used in amounts up to about 20-30/weight percent of the fiber plus resin composite. Due to rapid resin cure, flow distances may be limited and for longer flow distances multiple inlet ports may be required.

Another variant of resin transfer molding, referred to generally as high speed resin transfer molding, is particularly suitable for commercial production of products requiring a three dimensional reinforcement preform. Fiber content typically is in the 35-50 weight percent range. Tooling for high production volumes typically is made of steel in order to contain molding pressures of 100-500 psi and for good heat transfer characteristics. For more limited production requirements, aluminum or zinc tooling may be acceptable. Typically, molding is carried out at elevated temperatures to reduce the cure time. The preform is positioned within the molding tool cavity, the mold is closed and resin is injected. At higher reinforcement levels, that is, at higher fiber weight content, the mold may be left slightly opened during resin injection to promote more rapid filling of the molding cavity; the mold cavity would then be fully closed. Preferably, the curing of the resin is accomplished in the mold such that the product will require no post-bake cycle and will have acceptable dimensional stability. For complex components or components having critical dimensional tolerance requirements, a fixtured post-cure may be required for adequate dimensional stability.

In view of the fact that RTM processes allow placement of fiber reinforcement materials, containing any of the various available fiber types or combinations thereof, in the mold cavity with minimal subsequent movement of the reinforcement preform during injection of the resin, the fiber reinforcement preform can be designed for optimum performance at minimum weight. That is, the fiber reinforcement preform can be designed and assembled with the most appropriate amount and type of reinforcement fiber (e.g., glass, graphite, aramid, etc., either chopped or continuous, random or oriented) in each portion of the preform. This yields a product of more optimum performance at reduced weight. Also, the low pressure required for resin injection often allows the use of less expensive presses and the use of tooling somewhat less costly than that employed in high pressure compression molding or thermoplastic stamping processes. Furthermore, there is the opportunity for significant assembly and tooling expense reduction where a significant degree of sub-part integration is achieved. That is, the RTM manufacture can integrate into a single, large, complex FRP component a number of sub-components which in metal would be manufactured separately and then assembled. In addition, the low pressures employed in RTM processes often enable larger structures to be produced than would be practical by other molding processes. Current compression molding processes, for example, are constrained by the cost and/or availability of sufficiently large presses.

Considerable effort is now being made to further advance the technology of RTM processes. Specifically, development is on-going in the areas of tooling fabrication, resin chemistry, control of resin flow and cure rates, and fabrication of complex preforms. With respect to fabrication of the preform, chopped, random fiber reinforcement material may be employed for its low cost and ease of use. One of the most versatile techniques for creating RTM-preforms, especially 3-dimensional preforms, is the so called spray-up process, wherein chopped glass roving or other chopped fiber reinforcement material is sprayed onto a forming mandrel from a chopper gun. Typically, the fibers are resin coated or a small amount of resin is introduced into the stream of chopped fibers to cause it to be retained on the screen. When the fibers accumulate to the proper weight or depth the resin can be cured to fix the shape of the resultant preform. Typically, the forming mandrel is a screen and vacuum is applied to the back of the screen to hold the fiber onto the screen as they accumulate and also to help ensure uniformity of fiber depth in the various areas of the screen. As the holes in the screen become covered by fiber, the remaining open areas tend to attract more fiber, causing a self-leveling action. This is capable of producing preforms of complex, near net shape with low waste.

A significant difficulty in the use of RTM processes, however, involves the fragile nature of the fiber reinforcement preforms. Preforms typically are handled and transported during manufacture and storage and during placement into the RTM molding tool cavity. Such handling and transport can cause damage, dislocation and loss of the reinforcement material of the preform. This can diminish the quality of the finished FRP product. Also, loose fibers can be a problem in the work area. In addition, when a preform is placed into a molding tool cavity, it must not extend beyond the desired seal or pinch off areas in the tool, since this could interfere with the mold closing and sealing properly. Particular care must be taken that the fibers of the reinforcement material do not extend from the preform into such areas or become dislodged and fall into such areas. This is a concern especially in the case of preforms, e.g. sprayed-up preforms as described above, in which chopped, randomly oriented fibers are employed. A covering is sometimes employed on a preform during shipment and handling, which covering is discarded prior to placement of the preform into the molding tool cavity. However, some reinforcement fibers may still be disrupted and lost during placement of the preform into the molding tool cavity, thus, allowing loose fibers interfering with the closure and sealing of the molding tool cavity.

A problem with polyurethane RTM is that despite the relatively high and uniform fiber content, obtaining products of high modulus, high tensile strength, and elevated heat distortion temperatures is still problematic. This may be due in part to the same problems discussed previously with respect to spray systems employing glass fibers, where matrix adhesion to the reinforcing fibers is still not optimal. Thus, it would be desirable to provide a polyurethane RTM system with higher mechanical properties than heretofore available.

SUMMARY OF THE INVENTION

It has now been surprisingly discovered that inorganic fillers may be incorporated at high loadings into the isocyanate side of a polyurethane system, and yet the isocyanate side can remain stable in viscosity so as to be sprayable. Such systems, thus having filler in both A- and B-sides, can provide cured parts containing chopped fiber reinforcement which exhibit high tensile strength, high modulus, and high hardness, and which can replace traditional unsaturated polyester resins at adequate cost, while eliminating toxicological problems associated with the latter systems. In addition, articles prepared therefrom have exceptional impact resistance, and excellent interlaminar adhesion. It has further been surprisingly discovered that these same compositions, employing filler in the A-side as well as the B-side, can produce parts by RTM which have greatly elevated physical properties.

DETAILED DESCRIPTION OF THE PREFERRED EMBODIMENT(S)

The resin side and isocyanate side of the inventive compositions, except for the use of filler in both sides, are conventional.

Thus, for example, the resin side may be composed of one or more conventional polyurethane polyols, for example polyether polyols, polyester polyols, polycaprolactone polyols, etc., chain extenders, crosslinkers, etc. Reference in this respect may be had to Saunders and Frisch, POLYURETHANES, CHEMISTRY AND TECHNOLOGY, Interscience Publishers, New York, ©1962. However, the viscosity must be such that the filled composition is sprayable, and thus polyols of low viscosity are preferred. The viscosity as sprayed should be in the range of 500 cps to 5000 cps, preferably 1000 cps to 4000 cps, and most preferably, about 2000 cps. For RTM, the viscosity on the high end may extend to about 40,000 cps, more preferably to 20,000 cps, and most preferably to 10,000 cps.

Suitable polyether polyols, for example, are mono and copolymers of polymerized alkylene oxides, preferably polyoxypropylene diols, triols, tetrols, and the like, all of which are well known in the art. Polyester polyols may also be used, as may other polyols, including those terminated all or in part by amino groups, the latter introducing urea groups into the formulation. Suitable polyether polyols are available from BASF Corporation under the tradename PLURACOL® polyols, from Bayer under the tradenames MULTRANOL® and ACCLAIM® polyols, and from numerous other sources. The polyol molecular weight is preferably from 300 Da to about 20,000 Da, more preferably 400 Da to 10,000 Da, with functionalities preferably of from 2 to about 4, more preferably 2 to 3. Nominal functionalities (theoretical as opposed to measured) are preferably from 2 to 3. Particularly suitable are polyoxypropylene diols and triols prepared by oxyalkylating initiators such as ethylene glycol, diethylene glycol, triethylene glycol, propylene glycol, dipropylene glycol, 1,4-butane diol, 1,6-hexane diol, glycerine, trimethylolpropane, and the like. For higher modulus, higher functionality polyols such as those having functionalities of from 4 to 8 may be added. Such polyols may be produced by oxyalkylating higher functionality initiators such as pentaerythritol, sorbitol, sucrose, and starch. Graft polyols may also be used, preferably in minor amount relative to the remainder of isocyanate-reactive ingredients, due to their generally higher viscosity, and their cost.

Amine based polyols such as those prepared by oxyalkylating diamines and alkanolamines such ethylene diamine, toluene diamine, and diethanolamine can be used in minor amounts not to exceed 25 weight percent of the polyol component, preferably less than 20% by weight, more preferably less than 10% by weight. Aromatic amine-based polyols are generally highly viscous, and thus their use is problematic in this respect. Such polyols are also auto-catalytic due to their content of tertiary amine groups. The latter have a propensity to catalyze the water and isocyanate reaction, which can cause generation of foam or of numerous voids, which is undesirable. Moreover, if used in amounts greater than about 10-15 weight percent, cure time in spray systems becomes problematic due to the auto-catalytic nature of these polyols. If too rapid a cure is effected, a previous layer may completely cure before a subsequent layer is sprayed. Thus, interlayer adhesion may be compromised. Furthermore, too rapid a cure rate generates a large exotherm which can distort the article or even destroy the gel coat onto which the system is sprayed. It is preferable to avoid aromatic amine polyols or to limit their use to less than 10% by weight of the resin side, preferably less than 5%. It is preferable to limit tertiary aliphatic amine polyols in these same amounts, for the same reasons. These limitations apply to a lesser extent, if at all, for resin systems to be employed in RTM processes, where a reasonably rapid cure is desirable. However, the cure rate must not be so rapid that full flow of the resin system through the mold and impregnation of reinforcing fibers does not occur. Thus, the use of such amine polyols is still not preferred in RTM systems. A more rapid cure in such systems, when necessary, can be achieved by heating the mold, or by increasing the catalyst content.

Suitable chain extenders and crosslinkers are low molecular weight isocyanate reactive species generally containing hydroxyl and/or amino groups and having a molecular weight below 500 Da, preferably below 300 Da. Suitable chain extenders include ethylene glycol, diethylene glycol, propylene glycol, dipropylene glycol, 1,4-butane diol, 1,6-hexane diol, diethanolamine, and the like, while suitable crosslinkers include glycerine, trimethylolpropane, triethanolamine, N,N,N',N'-tetrakis[hydroxyalkyl]ethylene diamines, and the like and oxyalkylated derivations thereof. Chain extenders and crosslinkers are well known in the art. If a rapid gel time is desired, an oxyalkylated amine such as diethanolamine, triethanol amine, QUADROL®, etc., may be used. If amino-functional chain extenders are used, urea formation in addition to urethane formation will occur. Hydroxyl-functional chain extenders and crosslinkers are preferred. It is preferred not to include diamine or polyamine chain extenders in sprayable systems.

The resin side also generally contains a catalyst. The catalysts may include urethane catalysts as well as isocyanurate catalysts, and mixtures thereof. The well known tin catalysts such as dibutyltin diacetate and dibutyltin dilaurate are well suited, although other tin catalysts as well as bismuth catalysts and amine catalysts may also be used, among others. It may be desired to employ both an active catalyst in somewhat reduced amount in conjunction with a latent catalyst such as a metal acetylacetonate which becomes activated as the reaction mixture heats up through the action of the active catalyst.

The polyol side may also contain hydroxyl and/or amino-functional prepolymers, i.e. polyols which have been reacted with a less than stoichiometric amount of di- or polyisocyanate. This reaction may take place in situ, or urethane, urea, biuret, carbodiimide or other commercially available "modified" polyols may be used.

When polyoxypropylene polyols are employed, increased reactivity can often be obtained by terminating oxyalkylation of the polyol with ethylene oxide, to provide primary hydroxyl groups in excess of the amounts ordinarily associated with all-polyoxypropylene polyols. However, such polyols are preferably avoided or limited to a relatively minor portion of the resin side in sprayed systems, because these polyols increase sensitivity to water due to the hydrophilic character of the polyoxyethylene moieties. Thus, it is preferred that the polyol component contain less than 30 weight percent of such polyols, preferably less than 20 weight percent, more preferably less than 10 weight percent. Most preferably, the resin side contains no polyoxyethylene-capped polyols when used in spray applications. RTM systems are more tolerant to such polyols.

The water content of the polyol (resin) side should be as low as possible, and is desirably less than 500 ppm based on the weight of the resin side. This relatively low level of moisture is necessary to provide a non-foam laminate, and can be achieved by normal drying methods, including addition of water adsorbents, hydratable inorganic compounds, water scavengers, molecular sieves, and the like. Molecular sieves are not counted as filler unless they are added in an amount in excess of what is theoretically required to remove traces of water from the polyol.

Block copolymers derived from ethylene oxide and propylene oxide may also be used as the polyol component, as well as random (heteric) polyols. However, polyols derived by oxypropylation with propylene oxide, and which contain no or virtually no oxyethylene moieties are preferred. Such polyols are relatively hydrophobic. "Natural" polyols such as those based on castor oil or other hydroxyl-rich oils are also preferred, such as transesterified soy bean oil or other oils. These polyols constitute "renewable source" polyols.

The resin side, based on isocyanate-reactive species (exclusive, for example, of fillers), should have a hydroxyl number greater than 200, preferably greater than 250, and most preferably in the range of 300 to 450. The hydroxyl number should be less than 600, preferably less than 500. Hydroxyl numbers lower than the ranges cited do not result in a polyurethane of sufficient hardness. The hardness of the cured system should be greater than Shore D 85, and preferably in the range of Shore D 88 to 98, more preferably Shore D 88 to 95. The isocyanate side contains individual monomeric isocyanates, modified isocyanates, and/or isocyanate-terminated prepolymers. Conventional isocyanates such as toluene diisocyanates, methylenediphenylene diisocyanates, and higher molecular weight analogues such as polymeric MDI may be advantageously used. Higher functionality isocyanates such as polymeric MDI and isocyanurate triisocyanates may be used to increase the crosslink density and modulus.

Prepolymer isocyanates are prepared by reacting isocyanate with an isocyanate-reactive polymer in a 2:1 molar excess of isocyanate, while quasi-prepolymers are prepared using higher mol ratios of isocyanates, thus providing a mixture of isocyanate-terminated prepolymers and free isocyanate. In general, the NCO content of the prepolymers should be above 16 weight percent, preferably above 18 weight percent. Lower NCO contents can be used in RTM systems, particularly when heated molds are employed.

Modified isocyanates may be prepared by reacting isocyanates with low molecular weight species such as ethylene glycol, diethylene glycol, propylene glycol, or the like to produce "urethane-modified" isocyanates, or with themselves to produce isocyanates such as carbodiimide-modified isocyanates. A wide variety of di- and polyisocyanates are available commercially, as are also modified isocyanates, prepolymer isocyanates and quasi-prepolymer compositions.

The resin and isocyanate are generally reacted in an OH/NCO ratio of 0.85 to 5.0, preferably 0.9 to 3.0, and most preferably, minimally about 1:1.03. If non-stoichiometric reaction is contemplated, it is preferred that the stoichiometry favor an excess of NCO groups. The resin side and isocyanate side are preferably formulated so as to be mixable in a 1:1 volume ratio, although other ratios are also suitable for example 4:1 to 1:4, 2:1 to 1:2. When urethane systems are contemplated, an NCO index of minimally 100, more preferably 103-120, and most preferably about 105 are preferably employed. When the system contains an isocyanurate catalyst, a larger NCO index is required, for example in the range of 150-400, more preferably 190-250.

In the inventive systems, both the A-side and B-side contain appreciable amounts of fillers such that the total filler content of the composite contains in excess of 20 weight percent particulate filler, preferably at least 25 weight percent, yet more preferably greater than 35 weight percent, still more preferably greater than 35 weight percent, and most preferably in the range of 40-50% or more, these values again, being exclusive of chopped reinforcing fiber. For the B-side (resin side), virtually any filler may be used. Thus, for example, fillers such as sand, glass beads, crushed glass, glass flakes, and preferably fillers such as alumina, alumina trihydrate ("ATH"), crushed limestone, crushed dolomite, magnesite, magnesium hydroxide, talc, fumed and precipitated silica, barium sulfate, calcium sulfate, wollastonite, mica, bentonite, clay, etc. may all be used, among others. Organic fillers such as wood flour, cork dust, ground nut shells, and the like may also be added to the polyol side, but these are not preferred, and preferably avoided in the A side.

The particle size and surface area of the B-side fillers are such that the polyol side remains sprayable, or in the case of RTM, injectable. As the filler content increases, filler surface area in particular becomes of greater importance. Thus, at high filler loadings, filler particle sizes in the range of 1 to 200 µm, preferably 1 to 50 µm, and most preferably 1 to 20 µm are desirable. Fillers with average particle sizes as measured by light scattering techniques of from 2 to 5 µm have proven very effective, and fillers having some fractions below 1 µm show especial promise. For irregularly shaped fillers or porous fillers, the particle size which can be tolerated tends towards larger particle sizes, as opposed to non-porous compact fillers which generally have lesser surface area with respect to particle size. Most preferably, the particle surface area is less than 50 $m^2/g$, preferably between 5 $m^2/g$ and 20 $m^2/g$. If the particle size is too large, sprayability problems may be incurred solely due to the particle size, and not due to dispersion viscosity. Sprayability is easily determined by the skilled artisan, even by an applicator. The fillers may also be in the form of very short, fibers, preferably less than 1 mm in length, but this is not preferred. The fibers may be inorganic or organic in nature. Larger size fillers may be used in RTM, but increased physical properties are generally achieved with small diameter fillers.

Sprayability also means that the particle size, for spray systems, is sufficiently small to pass through the spray nozzle without clogging, irrespective of viscosity. Thus, for example, conventional glass flakes and the like are too large, although these may be milled to finer sizes. Various forms of fillers such as mica and metallic flakes may also be too large. As stated previously, fillers in the range of 1 to 200 µm (largest dimension), are preferred. In RTM systems, such flake or large particle size fillers may sometimes be used, but they must not be so large so as to be "filtered" by the fiber reinforcement already present in the mold. This "filtration effect" can have the undesirable effect of preventing the flow of liquid resin throughout the mold. Therefore, flake fillers, particularly those of appreciable size, are preferably avoided.

The amount of filler in the B-side in one embodiment is at least 20% by weight, and in order of increasing preference, at least 25%, 30%, 35%, 40%, 45%, and 50% by weight. If the surface area of the filler(s) and the viscosity of the particular component permits, amounts of filler in excess of 50%, for example 60% or higher, are also preferred.

The isocyanate side (A-side) is critical, as it is most undesirable to have to add filler just prior to use. Thus, the filler is preferably added by the manufacturer or formulator, and thus must be stable for extended periods of time to facilitate storage and transportation. Thus, for the A-side, the filler must be selected with these goals in mind, and in this context, must be a "stable" filler. A "stable" filler is one, which when added to the isocyanate side in the required quantity, does not cause the isocyanate side to gel or to increase in viscosity to the extent that it is no longer sprayable, or to cause other undesirable reactions such as "skinning". Applicants have surprisingly discovered that a select group of fillers is capable of meeting these requirements. These fillers include ATH, calcium carbonate (limestone), calcium magnesium carbonate (dolomite), magnesium carbonate (magnesite), talc, barium sulfate, clay, various aluminosilicates, mica, fly ash, diatomaceous earth, fullers earth, calcium sulfate, and the like. While it is desirable to provide a fully formulated and filled "A-side", the filler can also, if desired, be added just prior to use.

The stability of fillers in the A-side is highly surprising, since to Applicants' knowledge, there have been no filler-containing isocyanates or A-sides (when systems are contemplated) which have been commercial, and U.S. Pat. No. 4,543, 366, for example, indicates that when ATH is added as a filler, it must be added to the B-side.

It is necessary, in addition to selecting a stable filler, to also preferably to ensure that the filler in the A-side has a water content of less than about 1000 ppm relative to the total weight of the filler, more preferably less than 600 ppm, yet more preferably 500 ppm or less, and most preferably below 300 ppm. Fillers as manufactured generally contain significant amounts of water, for example 2000 ppm or more in many cases. Applicants have found that addition of such fillers to the isocyanate component can cause rapid reaction with the isocyanate. The isocyanate component, despite removal of water by this reaction, then tends to gel, thus being unstable. It has been surprisingly discovered that if these same fillers are rendered substantially anhydrous, meaning that the total free water content of the A-side is reduced to the above values or less, the isocyanate side, even when highly filled, can remain stable and sprayable. The same is true for A-side used in RTM systems.

To lower the water content to below 1000 ppm, several techniques may be used independently or in combination. For example, simple drying at elevated temperature is generally suitable. Drying may be conducted in an ordinary oven type dryer, in a vacuum oven, or in a fluidized bed dryer or the like, at any convenient pressure. Drying at elevated temperature under vacuum appears to be capable of extreme reduction in water content. Scavenging agents may also be used. These may be added to the filler itself, or may be first added to the isocyanate component, and the filler then added. Chemical scavenging agents are compounds which exhibit a considerably increased rate of reaction with water as compared to the isocyanates being used in the polyurethane system. One example is PTSI, p-toluenesulfonylisocyanate. However, other water scavengers such as isocyanatomethyltrimethoxysilane and scavengers used in the preparation of moisture-curable RTV-1 silicon compositions, which are known to those skilled in the art, may be used as well. In addition to the stable fillers described above, the isocyanate side may also contain finely milled glass fibers, glass flakes, and glass cullet, preferably in amounts of about 10% or less by weight relative to the total A-side weight, or other fillers in this same amount, as described previously for the B-side. However, the A-side must contain minimally, 5 weight percent of a stable filler as defined above, preferably at least 10%, more preferably at least 15%, and yet more preferably, in increasing preference, 20%, 25%, 30%, 35%, 40%, 45%, and 50% of stable filler, all these percentages based on the total weight of the A-side. If the physical and chemical characteristics of the filler(s) permit, amounts greater than 50% are also preferable. The particle sizes of these fillers must be such to meet the viscosity constraints and other sprayability or injectability (for RTM) requirements as previously described for the fillers in the polyol side.

Magnesium carbonate is one example of a stable filler, and is available in numerous forms, such as natural magnesite available from the Baymag Company, British Columbia, Canada, particles with surface areas of from 5 m$^2$/g to 20 m$^2$/g being suitable, as are particulate dolomites of similar particle sizes and characteristics. In general, it is preferred that the particle size be above 1 µm, preferably above 2 µm, and preferably in the range of 3-10 µm. If the particle size is too small, the high surface area may result in a viscous component which is not sprayable, perhaps even thixotropic or dilatant, even without any reaction with the components of the respective side. Mixtures of such fillers may also be used. Calcium carbonate is a preferred filler, and is available in a wide range of particle sizes from numerous sources.

It has been very surprisingly discovered that the isocyanate side, even when containing a large amount of a very active filler such as alumina trihydrate, nevertheless rapidly achieves a stable and still sprayable viscosity. With calcium carbonate as a filler, storage of the isocyanate component even for periods longer than 6 weeks has proven acceptable. Thus, the A side may be prepared separately and stored and/or shipped, as opposed to formulation just prior to use. In systems employing filler in both polyol side and iso side, it has also been discovered that systems with extraordinary tensile strength and modulus may be obtained. These increases are achieved without functionalizing the fillers, in contrast to the teachings of the art. Most surprisingly, when employed in conjunction with glass fibers, the modulus and impact strength are elevated considerably as compared with neat cast systems. In compositions containing filler in relatively high amounts, e.g. 35-50% or more, heat distortion temperature is also surprisingly elevated.

It has also been surprisingly discovered, however, that certain fillers cannot produce a stable system. Thus, when calcium hydroxide, which has been mentioned as a filler for many filled polymer systems, is employed in the A-side, the isocyanate rapidly gels and becomes unusable. Likewise, magnesium hydroxide causes a skin to form on the A-side during storage. If the skin is removed, it subsequently reforms. Calcium and magnesium hydroxide are not stable fillers. As the number of cost effective and commercially available fillers is limited, simple tests may be used to determine whether any particular filler is a stable filler. For example, an A-side may be formulated with the desirable amount of filler or mixture of fillers, and freedom from gellation and viscosity increase beyond a sprayable level may be easily and simply measured. ATH is a stable filler, and calcium carbonate, due to its low cost, is a preferred stable filler. Calcium sulfate is also a preferred filler.

In the subject invention applications, fibrous reinforcement, preferably in the form of glass fibers, must be included in the composite material. It is difficult to incorporate fibers into either the A-side or B-side if the fibers have any substantial length. Thus, fibers are not included in the filler content of the respective components, unless milled to lengths below 1 mm, preferably below 0.5 mm. Rather, it is preferable that chopped glass fibers are introduced into the spray cone of the sprayed polyurethane components, where the sprayed resin components impinge upon the fibers and direct them to the substrate. A wide variety of lengths of glass fibers may be incorporated by this method, however it is preferred that the glass fiber length be between about 0.4 cm and 8 cm, more preferably between 0.5 cm and 3.5 cm, and most preferably in the range of 0.6 to about 3.2 cm. Both sized and unsized fibers may be used. The fibers are generally supplied as chopped strands, although the strands may also be partially or fully opened into individual filaments. Unlike polyester systems, it has been surprisingly discovered fiber wet-out generally does not occur, and yet satisfactory impact strength and other physical properties such as tensile strength and flexural modulus can be obtained, so long as fillers are employed as well. The type and length of fibrous reinforcement is generally unlimited in RTM systems.

The amount of glass fibers in spray processes is limited, on the upper side, by the ability of the fibers to be wet-out sufficiently by the resin such that they are at least partially encapsulated in the laminate, and on the lower side, by the necessity to provide sufficient impact resistance of the cured structure. Fiberglass should generally be incorporated in amounts not less than 5 weight percent based on the weight of the layer containing these fibers, and may range upwards to 50 weight percent or more. Preferred content of fibers, glass or otherwise, is preferably within the range of 5 to 50 weight percent, more preferably 10 to 40 weight percent, yet more preferably 10 to 25 weight percent. In addition to or in lieu of glass fibers, other fibers may be used, including such fibers as carbon fibers, ceramic fibers, organic synthetic fibers including aramid fibers, and the like. In the case of RTM processes, the fibers may be in the form of mats or fabrics. These latter may also be used in spray processes, but not of course applied in the spray cone. Such woven and non-woven components may be positioned on the substrate and wet out with sprayed resin or even hand-worked resin, optionally followed by spraying of additional chopped fiber reinforced layers.

Regardless of the individual amounts of particulate filler and reinforcing fibers, the total amount of these components, filler plus reinforcing fibers, must total greater than 30 weight percent relative to a laminate layer weight in spray applied systems, more preferably greater than 32 weight percent, yet more preferably at least 35 weight percent, and also preferably, at least 40, 50, 60, and 70 weight percent. Compositions containing minimally 30 weight percent, more preferably 35 weight percent, and most preferably in the range of 40-50 weight percent of particulate filler are especially preferred, in conjunction with at least 5 weight percent, and more preferably 10-25 weight percent reinforcing fibers. Despite the fact that increasing amounts of fiber reinforcement tend to lower tensile strength and modulus, it has been very surprisingly found that systems employing about 35 weight percent particulate filler or more, in conjunction with minimally 10 weight percent reinforcing fibers offer high tensile strength, high modulus, and excellent impact resistance.

Conventional polyurethane systems which are filled only in the resin side are generally incapable of preparing high modulus composite structures, as stated previously. This may be illustrated by Examples C1 and C2, where a flexural modulus of less than 500 Kpsi is obtained with no filler, and still only 533 Kpsi with 21 weight percent filler in the resin side. In contrast, when filler is added to both the resin and isocyanate side, a truly surprising and significant increase to in excess of 1000 Kpsi is obtained. The composite structures of the present invention, whether produced by spray methods or RTM, preferably have a flexural modulus in excess of 750 Kpsi, more preferably about 800 Kpsi or more, yet more preferably in excess of 900 Kpsi, and most preferably about 1000 Kpsi or more.

The sprayed composite structures of the present invention are prepared by spraying the filled resin system onto a mold or other substrate, preferably in a plurality of layers. It is desired that each layer at least partially cure ("advance") prior to application of a subsequent layer, but not fully cure. In this manner, full interlayer adhesion is achieved, while heat buildup is minimized. These separate layers may nevertheless be applied in one continuous spray without cessation of spraying. The thickness of the layer may vary over a wide range, but is preferably from about 40 to 200 mils, more preferably 50-100 mils, and most preferably in the range of 80-95 mils. Preferably, two fiber reinforced layers are used, but in demanding applications, the number of layers is not limited. While a single layer may also be used, in many cases this would dictate a much thicker layer, for example 150 mils to 300 mils or higher. In such layers, the exotherm of the curing reaction can distort the substrate, inclusive of the gel coat, when used, unless the cure rate is decreased, for example by lowering the catalyst content. For structures of highly demanding performance such as boat hulls, numerous layers are likely to be employed.

The composites prepared by these processes have outstanding impact resistance, and can tolerate being dropped from heights, withstand hammer blows, etc. The impact resistance is equal to or greater than comparative structures of polyester and conventional epoxy resins prepared by spray up procedures.

In one such application, for example, an aesthetic gel coat is applied to a male bathtub mold, following which a layer of filled polyurethane which may be free of fibers or have a low fiber content is generally applied. For the purpose of such application, it is desirable that the spray head be suspended such that it is easily moveable, and is preferable that the tub (or spa, shower enclosure, boat hull, etc.) be able to rotate, for example on a turntable, to promote ease of application. Rather than manual application, application by robotic means is also possible. Additional applications include heavy truck parts such as hoods, fenders and windbreakers, other light, medium, and heavy structural parts, etc.

The initial coat may also contain reinforcing fibers, and in this respect, virtually any reinforcing fibers may be used. For cost reasons, glass fibers in the form of strands are preferably used, although carbon fibers, ceramic fibers, metal fibers, and polymer fibers may also be used. The second and subsequent coats except for the last coating layer, preferably contain reinforcing fibers, which are fed to the polyurethane spray exiting the spray nozzle (the "spray cone"). The total amount of chopped reinforcing fibers may be from 5% to 40% by weight, preferably 10 to 35% by weight, and more preferably about 15 to 25% by weight. As noted earlier, the chopped reinforcing fibers are not included when calculating the required particulate filler content. In some applications, the initial substrate itself may be formed by spraying an aesthetic surface coating onto a mandrel or other substrate onto which a release layer has been applied. Due to the hardness of the inventive polyurethane system, for example, it may be colored with standard dyes and pigments, and a fiber-free composition sprayed onto the mandrel or form to serve as an aesthetic layer or "gel coat". Subsequent fiber-containing layers may then be applied.

The last coat is preferably free of fibers, or has a much lower fiber content, and is designed to fully encapsulate any exposed fibers previously applied in earlier coats, such that handling of the finished article is facilitated. This coat is optional, but preferred.

In addition to the filler contained in the polyol side and isocyanate side of the polyurethane system, it is also possible to add additional filler "in situ". For example, pulverulent filler may be conveyed, for example in an air stream, and "broadcast" into the spray cone as the polyurethane is being sprayed. Alternatively, filler may be impacted against the wet polyurethane system prior to its gelling or hardening. In this manner, the filler content may be raised to very high values unobtainable only by adding filler to both sides of the system, or less highly filled systems may be used at the same total filler content. Systems for broadcasting pulverulent substances have been used in the past to broadcast powder onto partially cured and tacky surfaces such as floors to provide texture and slip resistance. Such systems are useful in the present invention, but direct the powder, here a filler, into the spray cone, and from there to the substrate. In this manner, up to about 30 weight percent of additional filler may be incorporated. However, the additional filler is preferably about 20 weight percent or less, based on the total weight of the polyurethane system, exclusive of reinforcing fibers. In a system containing 50 weight percent filler in both the A-side and B-side, this method can be used to raise the total amount of filler to 70-80 weight percent. Alternatively, a somewhat lower system solids content, for example 40% in the B-side and 30% in the A-side, which would result in a filler content of 35% total filler, can be employed with somewhat more viscous polyols and/or isocyanates so as to remain sprayable, while still achieving a total solids content of greater than 40 weight percent, the additional filler incorporated by broadcasting.

The spraying operation is preferably virtually continuous, with the supply of chopped fibers interrupted when necessary. The rapid cure of polyurethane systems generally allows a subsequent coat to be applied without interruption as the revolving substrate and/or moveable spray head reaches the area where the previous coat was first applied. Since full cure of this previous layer has preferably not occurred, some dissolution or "melding" of the subsequent coat components into the prior coat occurs, facilitating interlayer adhesion. The spray orifice diameter and shape is not critical, so long as a stable spray cone, preferably one with minimal atomization of the liquid composition is achieved. The nozzle geometry may vary with the viscosity of the system, and optimum geometry can easily be determined by one skilled in the art. It is also noted that there is a relationship between orifice size and filler content. With fibrous fillers, the fiber length must ordinarily be considerably smaller than the orifice diameter, as fibers may otherwise bunch and clog the spray head. The spray head should be capable of producing a relatively uniform spray cone in order that glass fibers can be added. It is highly preferred that atomizing nozzles such as "airless" nozzles not be employed. While some small droplets are to be expected from standard spray nozzles as well, it is preferred that the droplet size remain above the "atomized" level on the whole, to encourage fiber wet out and to avoid contamination of the surrounding air with fine droplets, generally necessitating complex and expensive air treatment facilities.

The subject invention polyurethane compositions which contains filler in the A-side as well as the B-side have also been found to be surprisingly effective in RTM processes where high strength and modulus are desired. In these processes, as described previously, fibrous reinforcement is placed into a closed mold and the polyurethane system injected into the mold. In the process, the polyurethane envelops the fibers in the mold, cures, and the fiber reinforced article is subsequently removed. Despite the relatively large amount of generally well distributed fiber reinforcement, ordinary polyurethane systems may not provide the desired physical characteristics. Surprisingly, the use of the same polyurethane compositions as described herein for sprayable applications can be used in RTM application, including the known RTM variants, and produce parts with elevated physical properties such as flexural modulus, tensile strength, impact resistance, and heat distortion temperature. All of these properties or any combination thereof may be elevated.

The fibrous reinforcement used in the RTM process includes all kinds of reinforcement which are useful. Conventionally, woven and non-woven fabrics, mats, etc. of fiber glass, carbon fiber, polymer fiber, natural fiber, and the like may be used. In appropriate molds, chopped fibers or continuous fiber yarn or tow may also be used.

The resin systems useful in RTM have essentially the same characteristics as those used in sprayable applications with one exception. Since a spray of the system is not required, and as moderate injection pressures may be used, the systems are more flexible with regard to their viscosity, and systems with a viscosity as high as 40,000 cps, preferably not more than 20,000 cps, and most preferably in the range of 2000 cps to 10,000 cps may be used. Thus, isocyanate-terminated prepolymers may be employed in the A-side, and more viscous polyols may be used in the B-side. Filler content may be elevated as well. Very high filler contents may thus be achieved in the final product.

Having generally described this invention, a further understanding can be obtained by reference to certain specific examples which are provided herein for purposes of illustration only and are not intended to be limiting unless otherwise specified.

EXAMPLES

Comparative Example C1

Polyol—(refer to the charts which follow for formulas and quantities of each ingredient in these examples) Multranol 4012 was added to a 5-gallon reactor and heated to 125° F. under full vacuum and agitation. Pure MDI is then added to the reactor and mixed under full vacuum for 1 hour. Thirty minutes into the reaction the reactor contents were heated to 185° F. under full vacuum, mixed for at least 1 hour after MDI addition, and the DEG, TMP, and UL-28 then added to the reactor contents. Mixing was continued under full vacuum for 30 minutes. Once the reactor contents had reached less than or equal to 600 ppm moisture, Type 3A molecular sieves were added and the reactor cooled. After mixing for 30 minutes and cooling to 150° F., the contents were packaged for later reaction.

Isocyanate—The jacket of a 5-gallon reactor was heated to 125° F. and Pure MDI added. The reactor contents were heated under full vacuum with agitation to 125° F. to 130° F., following which LG 650 was added under full vacuum and agitation. The reactor temperature was controlled so as to not exceed 185° F. The reaction is very exothermic, so cooling may be needed. After addition is complete, contents were mixed under full vacuum for at least one hour and the temperature adjusted to 150° F. before Multranol 4012 addition. At a temperature less than or equal to 150° F., Multranol 4012 is slowly added under full vacuum and agitation, the reactor temperature controlled so as to not exceed 185° F. After the addition is complete the reactor contents are mixed for at least one hour under full vacuum at 150° F. before proceeding. The contents are then mixed for 30 minutes under full vacuum. After the mixing is complete, the contents may be packaged at 150° F. or less for later reaction with the polyol side.

The Polyol and Isocyanate components were then combined with chopped glass fibers using a 2-component mix machine to form polyurethane spray composite laminates. The physical properties of this laminate can be found below in Table 1.

Example C2

Polyol—Multranol 4012 was added to a 5-gallon reactor and heated to 125° F. under full vacuum and agitation. Once the contents reached 125° F., Pure MDI was added to the reactor and mixed under full vacuum for 1 hour. Thirty minutes into reaction the reactor contents were heated to 185° F. under agitation and full vacuum, and mixed for at least 1 hour. DEG, TMP, BYK 359, and UL-28 were then added, and mixing continued under full vacuum for 30 minutes, following which Titanium Dioxide and ATH were added, maintaining the reactor at 185° F. and mixed under full vacuum for 30 minutes. Once the reactor contents reach less than or equal to 600 ppm moisture Type 3A sieves, Cabosil and Wacker N-20 fumed silica were added, and the contents mixed under full vacuum at 185° F. for 30 minutes, following which the contents of the reactor were cooled and packaged at 150° F. or below.

Isocyanate—The isocyanate component (A-side) was prepared as in Example 1.

The Polyol and Isocyanate components were then combined with chopped glass fibers using a 2-component mix machine to form polyurethane spray composite laminates. The physical properties of this laminate can be found below in Table 1.

Example 3

Polyol—Multranol 4012 was added to a 5-gallon reactor and heated to 125° F. under full vacuum and agitation. Pure MDI was added at 125° F. and mixed under full vacuum for 1 hour. Thirty minutes into the reaction, the reactor was heated to 185° F. under agitation and full vacuum. One hour after MDI addition, DEG, TMP, BYK 359, and UL-28 were added to the reactor, mixing continued under full vacuum for 30 minutes, and then Titanium Dioxide and ATH were added while maintaining the reactor at 185° F. The contents were mixed under full vacuum at 185° F. for 30 minutes. Once the reactor contents had reached less than or equal to 600 ppm moisture, Type 3A sieves, Cabosil and Wacker N-20 fumed silica were added and the contents mixed under full vacuum for 30 minutes, and cooled. After cooling the contents to 150° F. the contents may be packaged for later reaction.

Isocyanate—Mondur MR-L was added to a 5-gallon reactor at ambient temperature. After completing the Mondur MR-L addition, BYK 555 was added to the reactor and the contents mixed under full vacuum for 30 minutes. After mixing was complete, pre-dried ATH was added to the reactor contents. After the addition was complete the contents were mixed under full vacuum for 30 minutes using cooling as necessary to keep the contents below 135° F. After the mixing was complete, the reactor contents were packaged for later reaction with the polyol side.

The Polyol and Isocyanate components were then combined with chopped glass fibers using a 2-component mix machine to form polyurethane spray composite laminates. The physical properties of this laminate can be found below in Table 1.

Example 4

Polyol—Castor Oil was added to a 5-gallon reactor, and the contents heated to 185° F. under full vacuum and agitation. Once the contents had reached 185° F., PPG 425, DEG, TMP and BYK 359 were added. Mixing was continued under full vacuum for 30 minutes, following which Titanium Dioxide and Calcium Carbonate were added while maintaining the reactor at 185° F., and mixed under full vacuum at 185° F. for 30 minutes. Once the reactor contents had reached less than or equal to 600 ppm moisture, Type 3A sieves, Cabosil and Wacker N-20 fumed silica were added and mixed under full vacuum at 185° F. for 30 minutes. The reactor is cooled to 150° F. and the contents packaged for later reaction.

Isocyanate—Mondur MR-L was added to a 5-gallon reactor at ambient temperature. After completing the Mondur MR-L addition, BYK 555 was added to the reactor and mixed under full vacuum for 30 minutes. After mixing was complete, pre-dried Calcium Carbonate was added and mixed under full vacuum for 30 minutes, using cooling as necessary to keep the contents temperature below 135° F. Pre-dried Cabosil was added, the reactor returned to full vacuum, and mixed for 30 minutes. After the mixing was complete, the reactor contents were packaged for later reaction with the polyol side.

The Polyol and Isocyanate components were then combined with chopped glass fibers using a 2-component mix machine to form polyurethane spray composite laminates. The physical properties of this laminate can be found below in Table 1.

Example 5

Polyol—Multranol 4012 was added to a 5-gallon reactor and the contents of the reactor heated to 125° F. under full vacuum and agitation. Once the contents had reached 125° F., pure MDI was added to the reactor and mixed under full vacuum for 1 hour. Thirty minutes into the reaction the reactor was heated to 185° F. under agitation and full vacuum. Once the reactor had reached 185° F., DEG, TMP, BYK 359, and UL-28 were added and mixed under full vacuum for 30 minutes, following which Titanium Dioxide and the ATH were added while maintaining the reactor at 185° F. The contents were mixed under full vacuum at 185° F. for 30 minutes. Once the reactor contents had reached less than or equal to 600 ppm moisture, Type 3A sieves, Cabosil and Wacker N-20 fumed silica were added, mixed under full vacuum at 185° F. for 30 minutes, and the reactor cooled. After cooling to 150° F. the contents were packaged for later reaction.

Isocyanate—Mondur MR-L was added to a 5-gallon reactor at ambient temperature. After completing the Mondur MR-L addition, BYK 555 was added, the reactor placed under full vacuum, and mixed for 30 minutes. After mixing was complete, pre-dried ATH was added to the reactor contents, and the reactor returned to full vacuum and mixed for 30 minutes, using cooling as necessary to keep the contents temperature below 135° F. After the mixing was complete, the reactor contents were packaged for later reaction with the polyol side.

The Polyol and Isocyanate components were then combined with chopped glass fibers using a 2-component mix machine to form polyurethane spray composite laminates. The physical properties of this laminate can be found below in Table 1.

Example 6

Polyol—Multranol 4012 was added to a 5-gallon reactor and heated to 125° F. under full vacuum and agitation. Once the contents had reached 125° F., Pure MDI was added and mixed under full vacuum for 1 hour. Thirty minutes into the reaction, the reactor was heated to 185° F. under agitation and full vacuum. The DEG, TMP, BYK 359, and DBTDL were then added to the reactor, and mixing continued under full vacuum for 30 minutes. Titanium Dioxide and Calcium Carbonate were then added while maintaining the reactor at 185° F. and mixed under full vacuum for 30 minutes. Once the reactor contents had reached less than or equal to 600 ppm moisture, Type 3A sieves, Cabosil and Wacker N-20 fumed silica were added and mixed under full vacuum at 185° F. for 30 minutes, following which the reactor was cooled. After cooling to 150° F. the contents were packaged for later reaction.

Isocyanate—Mondur MR-L was added to a 5-gallon reactor at ambient temperature. After completing the Mondur MR-L addition, BYK 555 was added to the reactor contents, the reactor placed under full vacuum and mixed for 30 minutes. After mixing was complete, pre-dried Calcium Carbonate was added to the reactor contents, the reactor returned to full vacuum and mixed for 30 minutes, using cooling as necessary to keep the contents temperature below 135° F. Pre-dried Cabosil was then added to the reactor and the reactor returned to full vacuum and mixed for 30 minutes. After mixing was complete, the reactor contents were packaged for later reaction with the polyol side.

The Polyol and Isocyanate components were then combined with chopped glass fibers using a 2-component mix machine to form polyurethane spray composite laminates. The physical properties of this laminate can be found below in Table 1.

Comparative Example C1

0.00% Filler not Including Glass

| Polyol: | |
| --- | --- |
| Multranol 4012 | 95.75% |
| Pure MDI | 1.75% |
| Diathylene Glycol (DEG) | 0.50% |
| Trimethyl Propane (TMP) | 0.50% |
| Fomrez UL-28 (Tin) | 0.0143% |
| Type 3A Sieve | 1.49% |
| | 100.00% |
| ISO: | |
| Pure MDI | 64.03% |
| LG 650 | 6.4400% |
| Multranol 4012 | 7.03% |
| Mondur MR-L | 22.50% |
| | 100.00% |
| Reacted at 1:1 volume or the following by weight: | |
| Polyol: | 46.94% |
| Iso: | 53.06% |
| | 100.00% |

Example C2

21.43% Filler not Including Glass. Filled Polyol Only

| Polyol: | |
| --- | --- |
| Multranol 4012 | 51.77% |
| Pure MDI | 0.31% |
| Diethylene Glycol (DEG) | 1.70% |
| Titanium Dioxide | 1.00% |
| Trimethyl Propane (TMP) | 1.70% |
| Fomrez UL-28 (Tin) | 0.0157% |
| Alumina Trihydrate (ATH) | 38.50% |
| Type 3A Sieve | 3.00% |

-continued

| | |
|---|---|
| Wacker N-20 fumed silica | 0.50% |
| Cabosil | 0.50% |
| BYK 359 | 1.00% |
| | 100.00% |

ISO:

| | |
|---|---|
| Pure MDI | 64.03% |
| LG 650 | 6.4400% |
| Multranol 4012 | 7.03% |
| Mondur MR-L | 22.50% |
| | 100.00% |

Reacted at 1:1 volume or the following by weight:

| | |
|---|---|
| Polyol: | 55.65% |
| Iso: | 44.35% |
| | 100.00% |

Example 3

38.43% Filler not Including Glass

Polyol:

| | |
|---|---|
| Multranol 4012 | 49.78% |
| Pure MDI | 0.30% |
| Diethylene Glycol (DEG) | 4.81% |
| Titanium Dioxide | 0.97% |
| Trimethyl Propane (TMP) | 1.77% |
| Fomrez UL-28 (Tin) | 0.0309% |
| Alumina Trihydrate (ATH) | 36.66% |
| Type 3A Sieve | 2.93% |
| Wacker N-20 fumed silica | 0.89% |
| Cabosil | 0.89% |
| BYK 359 | 0.97% |
| | 100.00% |

ISO:

| | |
|---|---|
| Mondur MRL | 60.00% |
| Byk 555 | 0.0110% |
| ATH | 40.00% |
| | 100.01% |

Reacted at 1:1 volume or the following by weight:

| | |
|---|---|
| Polyol: | 46.92% |
| Iso: | 53.08% |
| | 100.00% |

Example 4

45.01% Filler not Including Glass

Polyol:

| | |
|---|---|
| Castor Oil | 32.00% |
| PPG 425 | 8.00% |
| Diethylene Glycol (DEG) | 6.50% |
| Titanium Dioxide | 1.00% |
| Trimethyl Propane (TMP) | 6.50% |
| Calcium Carbonate | 39.00% |
| Type 3A Sieve | 5.00% |

-continued

| | |
|---|---|
| Wacker N-20 fumed silica | 0.50% |
| Cabosil | 0.50% |
| BYK 359 | 1.00% |
| | 100.00% |

ISO:

| | |
|---|---|
| Mondur MRL | 49.75% |
| Byk 555 | 0.0110% |
| Calcium Carbonate | 50.00% |
| Cabosil | 0.25% |
| | 100.01% |

Reacted at 1:1 volume or the following by weight:

| | |
|---|---|
| Polyol: | 45.33% |
| Iso: | 54.67% |
| | 100.00% |

Example 5

45.18% Filler not Including Glass

Polyol

| | |
|---|---|
| Multranol 4012 | 48.23% |
| Pure MDI | 0.29% |
| Diethylene Glycol (DEG) | 1.75% |
| Titanium Dioxide | 1.00% |
| Trimethyl Propane (TMP) | 2.00% |
| Fomrez UL-28 (Tin) | 0.0309% |
| Alumina Trihydrate (ATH) | 41.00% |
| Type 3A Sieve | 3.00% |
| Wacker N-20 fumed silica | 0.85% |
| Cabosil | 0.85% |
| BYK 359 | 1.00% |
| | 100.00% |

ISO:

| | |
|---|---|
| Mondur MRL | 51.20% |
| Byk 555 | 0.0110% |
| ATH | 48.80% |
| | 100.01% |

Reacted at 1:1 volume or the following by weight:

| | |
|---|---|
| Polyol: | 46.43% |
| Iso: | 53.57% |
| | 100.00% |

Example 6

45.86% Filler not Including Glass

Polyol

| | |
|---|---|
| Multranol 4012 | 48.78% |
| Pure MDI | 0.29% |
| Diethylene Glycol (DEG) | 1.75% |
| Titanium Dioxide | 1.00% |
| Trimethyl Propane (TMP) | 1.75% |
| DBTDL (Tin) | 0.0270% |
| Calcium Carbonate | 41.00% |

-continued

| | |
|---|---|
| Type 3A Sieve | 3.00% |
| Wacker N-20 fumed silica | 0.70% |
| Cabosil | 0.70% |
| BYK 359 | 1.00% |
| ISO: | 100.00% |
| Mondur MRL | 49.75% |
| Byk 555 | 0.0110% |
| Calcium Carbonate | 50.00% |
| Cabosil | 0.25% |
| | 100.01% |
| Reacted at 1:1 by volume or the following by weight: | |
| Polyol: | 46.02% |
| Iso: | 53.98% |
| | 100.00% |

In Example C1, no filler is employed, and despite the composite containing 24% chopped fiber glass reinforcement, had a flexural modulus of only 0.472 Mpsi. Example C2 contained ca. 21 weight percent filler as well as 25 weight percent of chopped fiber glass reinforcement, but contained filler only in the polyol side. The flex modulus increased, but only to 0.533 Mpsi, while the flexural strength and tensile strength actually decreased somewhat. Example 3, which contained filler in both the resin side and iso side, despite containing somewhat less glass fiber (21%) showed a truly surprising and unexpected increase in flex modulus and tensile modulus. The notched Izod impact strength was almost double that of Comparative Example C1.

Example 7

An RTM molding is prepared by inserting a fiberglass reinforcement preform into a mold, injecting the composition of Example 6 and curing. The fibrous reinforcement constitutes 20 weight of the finished composite. Physical properties of the cured composite are set forth in Table 2.

Example C3

A second RTM molding is prepared as in Example 7, but containing 26 weight percent of fiberglass, and injecting the resin system of comparative Example C1, containing no filler. The physical properties of the cured composite are set forth in Table 2.

TABLE 2

| | Example C3 RTM 26% Glass A | Example 7 RTM 20% Glass A |
|---|---|---|
| Flexural Strength, KPSI | 24.3 | 22.2[1] |
| MPA | | 153 |
| Flexural Modulus, MPSI | 0.858 | 1.28[1] |

TABLE 1

| | Units | Example C1 12 blade 24% Glass A | Example C2 8 blade 25% Glass A | Example 3 8 blade 21% Glass B | Example 4 8 blade 21% Glass B | Example 5 8 blade 21% Glass B | Example 6 8 blade 23% Glass B |
|---|---|---|---|---|---|---|---|
| Flexural Strength (Avg) | MPA[1] | | | 121 | 93.6 | 113 | 97.5 |
| | Kpsi[2] | 15.1 | 14.0 | 17.4 | | | |
| Flexural Modulus (Avg) | MPa[1] | | | 7137 | 4757 | 6032 | 6278 |
| | Mpsi[2] | 0.472 | 0.533 | 1.020 | | | |
| Tensile Strength, Dry (Avg) | MPA[3] | | | 54.5 | 47.8 | 51.7 | 50 |
| | Kpsi[4] | 8.7 | 8.6 | 7.9 | | | |
| Tensile Modulus, Dry (Avg) | MPa | | | 7782 | 5397 | 7724 | 7681 |
| | Mpsi | 0.516 | 0.759 | 1.196 | | | |
| Izod Impact - notched Avg) | kj/m$^2$[5] | 17.8 | 25.4 | 32.9 | 27.5 | 25.3 | 26.8 |
| Izod Impact - notched Avg) | ft * lb/in[6] | | 3.81 | 4.9 | | | |
| Izod Impact - unnotched Avg) | kj/m$^2$ | | | 35.3 | 26.2 | 29.6 | 36.9 |
| Izod Impact - unnotched Avg) | ft * lb/in | | | 6.7 | | | |
| Tg° C. | | | | | 86.8° C. | 107.2° C. | 138° C. |
| HDT° C., @ 66 psi | | | | | 235.0° C. | 224.0° C. | 233° C. |
| HDT° C., @ 264 psi | | | | | 72.0° C. | 66.0° C. | 74.0° C. |

[1]ISO 14125
[2]ASTM D790
[3]ISO 527-2
[4]ASTM D638
[5]ISO 180
[6]ASTM D256

TABLE 2-continued

| | Example C3 RTM 26% Glass A | Example 7 RTM 20% Glass A |
|---|---|---|
| MPA | | 8,846 |
| Tensile Strength, Dry KPSI | 15.7 | |
| MPA | | 62.7 |
| Tensile Modulus, Dry MPSI | 0.635 | 1.22[1] |
| MPA | | 8,393 |
| Izod Impact - notched ft * lb/in | 5.6 | |
| kj/m$^2$ | | 47 |

[1]Converted from SI to English units

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A highly filled multilayer composite structure, prepared by spraying onto a substrate, at least one non-foam polyurethane layer comprising:
   a) an isocyanate component containing minimally about 5 weight percent of a stable particulate filler dispersed therein, the isocyanate component comprising an aromatic isocyanate, modified aromatic isocyanate, or aromatic isocyanate prepolymer, wherein the aromatic isocyanate comprises a toluene diisocyanate, methylene diphenylene diisocyanate, or polymethylene polyphenylene polyisocyanate, and
   b) a polyol component containing minimally about 15 weight percent of a particulate filler dispersed therein,
   wherein the components a) and b) are mixed together and immediately sprayed onto the substrate to form a particulate filler and fiber reinforced layer, wherein fibrous reinforcement is additionally included in the composite structure by introducing chopped fibers into a spray cone which impinges upon the fibrous reinforcement and directs it to the substrate, wherein the total particulate filler content of the layer is minimally 20 weight percent, and wherein the total of particulate filler and fiber reinforcement is greater than 30 weight percent, and
   optionally repeating the spraying to form a multilayer structure, wherein the isocyanate component is substantially free of water and the polyol component is substantially free of water.

2. The composite structure of claim 1, wherein components a) and b) each contain minimally 20 weight percent filler, and wherein the total amount of filler is 35 weight percent or more.

3. The composite structure of claim 1 which comprises minimally two particulate filler and fiber reinforced layers.

4. The composite structure of claim 1, wherein the isocyanate component a) contains minimally about 20 weight percent filler.

5. The composite structure of claim 1, wherein the isocyanate component a) contains minimally about 20 weight percent particulate filler and the total particulate filler in the particulate filler and fiber reinforced layer contains minimally 35 weight percent particulate filler and wherein the total of fillers and fiber reinforcement is greater than 45 weight percent.

6. The composite structure of claim 1, which has a flexural modulus measured by ASTM D790 of 750,000 psi or greater.

7. The composite structure of claim 1, wherein at least one particulate filler is selected from the group consisting of calcium carbonate, calcium sulfate, and aluminum trihydrate.

8. The composite structure of claim 1, wherein further particulate filler is broadcast into the spray cone such that the total particulate filler is higher than the total particulate filler content of the a) and b) components.

9. The composite structure of claim 1, wherein the water content of the filler in the isocyanate component a) is less than 1000 ppm based on the weight of the filler, and the polyol component contains less than 500 ppm water based on the polyol component.

10. The structural composite of claim 1, wherein the polyol component b) has a hydroxyl number, calculated exclusive of filler, of from 300 to 500.

11. The structural composite of claim 1, wherein the isocyanate index is greater than 150, and an isocyanurate-promoting catalyst is additionally present.

12. A process for the preparation of a non-foam polyurethane composite structure, comprising:
   mixing in a spray head
   a) a substantially water-free isocyanate component containing minimally about 5 weight percent of stable particulate filler dispersed therein, the isocyanate component comprising an aromatic isocyanate, modified aromatic isocyanate, or aromatic isocyanate prepolymer, wherein the aromatic isocyanate comprises a toluene diisocyanate, methylene diphenylene diisocyanate, or polymethylene polyphenylene polyisocyanate, and
   b) a substantially water-free polyol component containing minimally about 15 weight percent of a particulate filler dispersed therein,
   and introducing chopped reinforcing fibers into a spray cone of mixture from the spray head, and spraying the resultant mixture onto a substrate to form a particulate filler and fiber reinforced layer, optionally repeating spraying to form multiple layers, and curing to form a composite structure, wherein the total particulate filler content of a particulate filler and fiber reinforced layer is minimally 20 weight percent, and wherein the total of particulate filler and reinforcing fiber in the layer is greater than 30 weight percent.

13. The process of claim 12, wherein the substrate comprises an aesthetic surface.

14. The process of claim 12, wherein prior to spraying said particulate filler and fiber reinforced layer onto said substrate, a substantially fiber free layer comprising components a) and b) is applied to said substrate.

15. The process of claim 12, wherein minimally two particulate filler and fiber reinforced layers are successively applied.

16. The process of claim 12, wherein a second particulate filler and fiber reinforced layer is applied before a first layer has completely cured.

17. The process of claim 12, wherein the isocyanate component a) contains minimally about 20 weight percent filler.

18. The process of claim 12, wherein the isocyanate component a) contains minimally about 20 weight percent particulate filler and the total particular filler in the particulate filler and fiber reinforced layer contains minimally 35 weight percent particulate filler and wherein the total of fillers and fiber reinforcement is greater than 45 weight percent.

19. The process of claim 12, wherein the composite structure has a flexural modulus greater than 750,000 psi as measured by ASTM D790.

20. The process of claim 12, wherein at least one particulate filler is selected from the group consisting of calcium carbonate calcium sulfate, and aluminum trihydrate.

21. The process of claim 12, wherein further particulate filler is broadcast into the spray cone such that the total particulate filler is higher than the total particulate filler content of the a) and b) components.

22. The process of claim 12, wherein the isocyanate index is greater than 150 and an isocyanurate-promoting catalyst is present.

23. In a resin transfer molding process wherein a reactive liquid polymer-forming component is introduced into a mold containing fiber reinforcement, the improvement comprising selecting as said liquid polymer-forming component, a polyurethane system comprising:
   a) a substantially water-free isocyanate component containing minimally about 5 weight percent of a stable particulate filler dispersed therein, the isocyanate component comprising an aromatic isocyanate, modified aromatic isocyanate, or aromatic isocyanate prepolymer, wherein the aromatic isocyanate comprises a toluene diisocyanate, methylene diphenylene diisocyanate, or polymethylene polyphenylene polyisocyanate.

b) a substantially water-free polyol component containing minimally about 15 weight percent of a particulate filler dispersed therein, and wherein the total particulate filler content of the polyurethane system is minimally 20 weight percent.

24. The process of claim 23, wherein the total particulate filler content of the polyurethane system is minimally 35 weight percent.

25. A resin transfer molded part produced by the process of claim 23, having a flexural modulus of 750,000 psi or more as measured by ASTM D790.

26. The composite structure of claim 1, wherein the isocyanate of the isocyanate component is an isocyanate selected from the group consisting of modified toluene diisocyanate or a toluene diisocyanate prepolymer, methylene diphenylene diisocyanate, polymethylene polyphenlene polyisocyanate, and isocyanate-terminated prepolymer or quasi-prepolymer prepared from methylene diphenylene diisocyanate.

27. The composite structure of claim 1, wherein the isocyanate component is an isocyanate-terminated prepolymer prepared from methylene diphenylene diisocyanate or a mixture of methylene dephenylene diisocyanate with one or more of toluene diisocyanate or polymethylene polyphenylene polyisocyanate.

28. The composite structure of claim 1, wherein at least one of the isocyanate component and the polyol component contains at least 20 weight percent of particulate filler, and the total amount of filler in the composite structure is at least 35 weight percent based on the weight of the composite structure.

* * * * *

UNITED STATES PATENT AND TRADEMARK OFFICE
CERTIFICATE OF CORRECTION

PATENT NO. : 7,842,349 B2  Page 1 of 1
APPLICATION NO. : 11/870721
DATED : November 30, 2010
INVENTOR(S) : Robert Michael Raday It is certified that error appears in the above-identified patent and that said Letters Patent is hereby corrected as shown below:

Column 26, Line 2, Claim 26:
(Page 6, Line 4, Claim 26: Supplemental Preliminary Amendment dated December 4, 2009):

After "polymethylene"
Delete "polyphenlene" and insert --polyphenylene--.

Column 26, Line 8, Claim 27:
(Page 6, Line 3, Claim 27: Supplemental Preliminary Amendment dated December 4, 2009):

After "mixture of methylene"
Delete "dephenylene" and insert --diphenylene--.

Signed and Sealed this
Fifteenth Day of March, 2011

David J. Kappos
*Director of the United States Patent and Trademark Office*